(12) United States Patent
Haney et al.

(10) Patent No.: US 8,195,340 B1
(45) Date of Patent: Jun. 5, 2012

(54) DATA CENTER EMERGENCY POWER MANAGEMENT

(75) Inventors: David Wayne Haney, Richmond, KS (US); Christopher Joseph Mateski, Overland Park, KS (US); Andrew Lee Davey, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 793 days.

(21) Appl. No.: 11/612,122

(22) Filed: Dec. 18, 2006

(51) Int. Cl.
*G05D 17/00* (2006.01)
(52) U.S. Cl. ........................ 700/295; 709/223; 713/340
(58) Field of Classification Search .................. 709/223; 700/295
See application file for complete search history.

(56) References Cited

U.S. PATENT DOCUMENTS

| | | | |
|---|---|---|---|
| 5,958,055 A * | 9/1999 | Evoy et al. ................. | 713/310 |
| 7,210,048 B2 * | 4/2007 | Bodas ......................... | 713/320 |
| 7,644,051 B1 * | 1/2010 | Moore et al. ................ | 706/21 |
| 2003/0055969 A1 * | 3/2003 | Begun et al. ............... | 709/226 |
| 2003/0056125 A1 * | 3/2003 | O'Conner et al. ......... | 713/300 |
| 2004/0230848 A1 * | 11/2004 | Mayo et al. ................. | 713/320 |
| 2004/0260490 A1 * | 12/2004 | Matsubayashi et al. .... | 702/60 |
| 2005/0055590 A1 * | 3/2005 | Farkas et al. ............... | 713/320 |
| 2005/0057879 A1 * | 3/2005 | Fan et al. .................... | 361/118 |
| 2005/0128659 A1 * | 6/2005 | Hibi et al. ................... | 361/20 |
| 2005/0138432 A1 * | 6/2005 | Ransom et al. ............. | 713/201 |
| 2005/0207081 A1 * | 9/2005 | Ying ........................... | 361/105 |
| 2006/0053311 A1 * | 3/2006 | Chary ......................... | 713/300 |
| 2006/0112286 A1 * | 5/2006 | Whalley et al. ............ | 713/300 |
| 2006/0282685 A1 * | 12/2006 | Bahali et al. ............... | 713/300 |
| 2007/0005994 A1 * | 1/2007 | Bahali et al. ............... | 713/300 |
| 2007/0030613 A1 * | 2/2007 | Sousa et al. ................ | 361/92 |
| 2007/0067657 A1 * | 3/2007 | Ranganathan et al. ..... | 713/320 |
| 2007/0094527 A1 * | 4/2007 | Frietsch et al. ............. | 713/340 |
| 2007/0101173 A1 * | 5/2007 | Fung .......................... | 713/300 |
| 2007/0216392 A1 * | 9/2007 | Stevens et al. ............. | 323/355 |
| 2007/0271006 A1 * | 11/2007 | Golden et al. .............. | 700/295 |
| 2007/0300083 A1 * | 12/2007 | Goodrum et al. .......... | 713/300 |
| 2008/0005596 A1 * | 1/2008 | Sistla et al. ................ | 713/300 |
| 2008/0052027 A1 * | 2/2008 | Witter et al. ............... | 702/108 |
| 2008/0052545 A1 * | 2/2008 | Finkelstein et al. ........ | 713/300 |
| 2008/0126832 A1 * | 5/2008 | Morosan et al. ........... | 714/4 |

OTHER PUBLICATIONS

Data Center Management [online] [retrieved on Oct. 18, 2006]. Retrieved from the Internet<http://www.cyclades.com/solutions/technology.php>.
Data Center Solutions and KVM switches [online] [retrieved on Oct. 18, 2006]. Retrieved from the Internet<http://www.avocent.com/web/en.nsf/Content/DataCenterKVMSwitches>.
Data Center Management: Compare Datacenter Management Sofware & Datacenter Hadware Solution [online] [retrieved on Oct. 18, 2006]. Retrieved from the Internet:<http://www.42u.com/datacenter-management.htm>.

* cited by examiner

*Primary Examiner* — Firmin Backer
*Assistant Examiner* — Hamza Algibhah (57) ABSTRACT

A media, method, and data center power management system are provided to manage planned and unplanned data center power outages in a data center having network elements. During a planned outage, a remote device generates a request to simulate a power outage. The data center management system processes the request and suggests powering off one or more network elements based on a role associated with the network element and a measured power consumption associated with each network element. During an unplanned outage, the data center management system receives environmental data that triggers the generation of instructions to power off one or more network elements based on at least one of a calculated uptime associated with one or more backup generators, a role associated with each network element, and a power consumption associated with each network element.

20 Claims, 5 Drawing Sheets

DATA CENTER EMERGENCY POWER MANAGEMENT

BACKGROUND

Conventionally, a power management system reacts to power outages by utilizing backup power provided by the backup generators, batteries, or other backup power sources. The conventional power management system generates a notification to inform a remote client that the power source supplying a collection of servers has changed over to a backup power source from a primary power source. An administrator that receives the notification from the remote client decides how to react to the switch from the primary power source while the collection of servers continue to operate on the backup power sources, which have a limited supply of power.

Typically, the conventional power management systems continue operating the collection of servers on the backup power source until the primary power source is reestablished or until the backup power source is exhausted. In some instances, the conventional power management systems are configured with shutdown threshold power levels that are associated each backup power source. When the collection of servers operating on the backup power sources consume backup power to the extent that power levels of the backup power sources reach the shutdown threshold power level, all servers in the collection of servers are shutdown by the conventional power management systems.

The conventional power management systems only perform a logical shutdown on all servers in the collection of servers and do not continue operating critical servers on the backup power source after the shutdown threshold is satisfied. In other words, the conventional power management systems fail to consider the relative importance of each server in the collection of servers during a power outage.

SUMMARY

The present invention is defined by the claims below. Embodiments of the present invention solve at least the above problems by providing a system and media for, among other things, managing power allocation during planned and unplanned power outages. The present invention has several practical applications in the technical arts including selectively operating network elements based on roles associated with the network elements during planned and unplanned power outages, monitoring power consumption associated with each network element in a data center, and performing logical shutdowns and physical shutdowns to non-critical network elements during the planned and unplanned power outages.

In a first aspect, a set of computer-useable instructions provide a method to respond to unplanned power outages in a data center have environmental devices. The environmental devices collect realtime environmental data for the data center and each network element in the data center. A data center power management system processes the relative data to detect a specific environmental condition, such as a HVAC failure or power outage. In turn, the data center power management system may calculate an uptime for network elements currently operating in the data center based on the specific environmental condition. The data center power management system utilizes the uptime to generate power down suggestions specifying one or more network elements based on the role of the network elements and automatically selects suggested network elements based on a level of power consumption associated with the suggested network elements. The selected network elements are logically shutdown by the data center power management system.

In a second aspect, a data center power management system enables a method to trigger a planned power outage in data center. The data center power management system receives a request from a remote client device. The request may indicate that an planned power outage is being performed in the data center. The data center power management system stores the request in an event database and provides power down suggestions specifying one or more network elements in response to the request. A user that interfaces with the remote client device may select one or more of the suggested network elements. In turn; the data center power management system logically shutdown the selected network elements.

In a third aspect, a data center power management system includes environmental devices, managed power distribution components, and a power management server. The environmental devices collect realtime environmental data for a data center having network elements. The managed power distribution component manages power supplied to each network element in the data center. The power management server comprises a client interface that connects a remote device, a network element interface that connects to the network elements in the data center, an environmental device interface that connects to the environmental devices, and a power management interface that connects to the managed power distribution component. The power management server controls the power provided to the network elements based on a role associated with the network elements and the environmental data provided by the environmental devices.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Embodiments of the present invention provide media and systems that be utilized during planned and unplanned power outages in a data center. A data center power management system reacts to environmental conditions, such as power failures, based on roles assigned to each network element in the data center. The data center power management system efficiently powers off network elements in the datacenter based on the roles and relative importance of the network elements. For instance, during a power outage the data center power management system provides a server that receives the environmental conditions, processes the environmental conditions and the roles assigned to each network elements in the data center, and initiates a logical shutdown of one or more applications and a physical shutdown of the power supplies associated with network elements that are non-critical. If the network element implements a failover protocol the logical shutdown may include starting up one or more failover applications on a neighboring failover network element before shutting down the one or more applications on the selected network element.

Acronyms and Shorthand Notations

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

HTTP Hypertext Transport Protocol
HVAC Heating Ventilation and Air Conditioning
UPS Uninterrupted Power Supply As utilized herein, the term "component" refers to any combination of hardware, software, and firmware. As utilized herein, the term "logical shutdown" refers to closing all applications including an operating system, or any subset of applications executing on a network element. As utilized herein, the term "physical shutdown" refers to removing power from the power supply associated with the network element. As utilized herein, the term "uptime" refers to a period of time during which one or more network elements can continue normal operations after a specified environmental condition occurs.

Computer-readable media include both volatile and nonvolatile media, removable and nonremovable media, and contemplates media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Embodiment of the present invention operate in a environment having a data center power management system, network elements, and environmental devices that collect environmental data. The data center power management system utilizes the environmental data to intelligent manages the network elements during planned and unplanned power outages.

Figure 1:
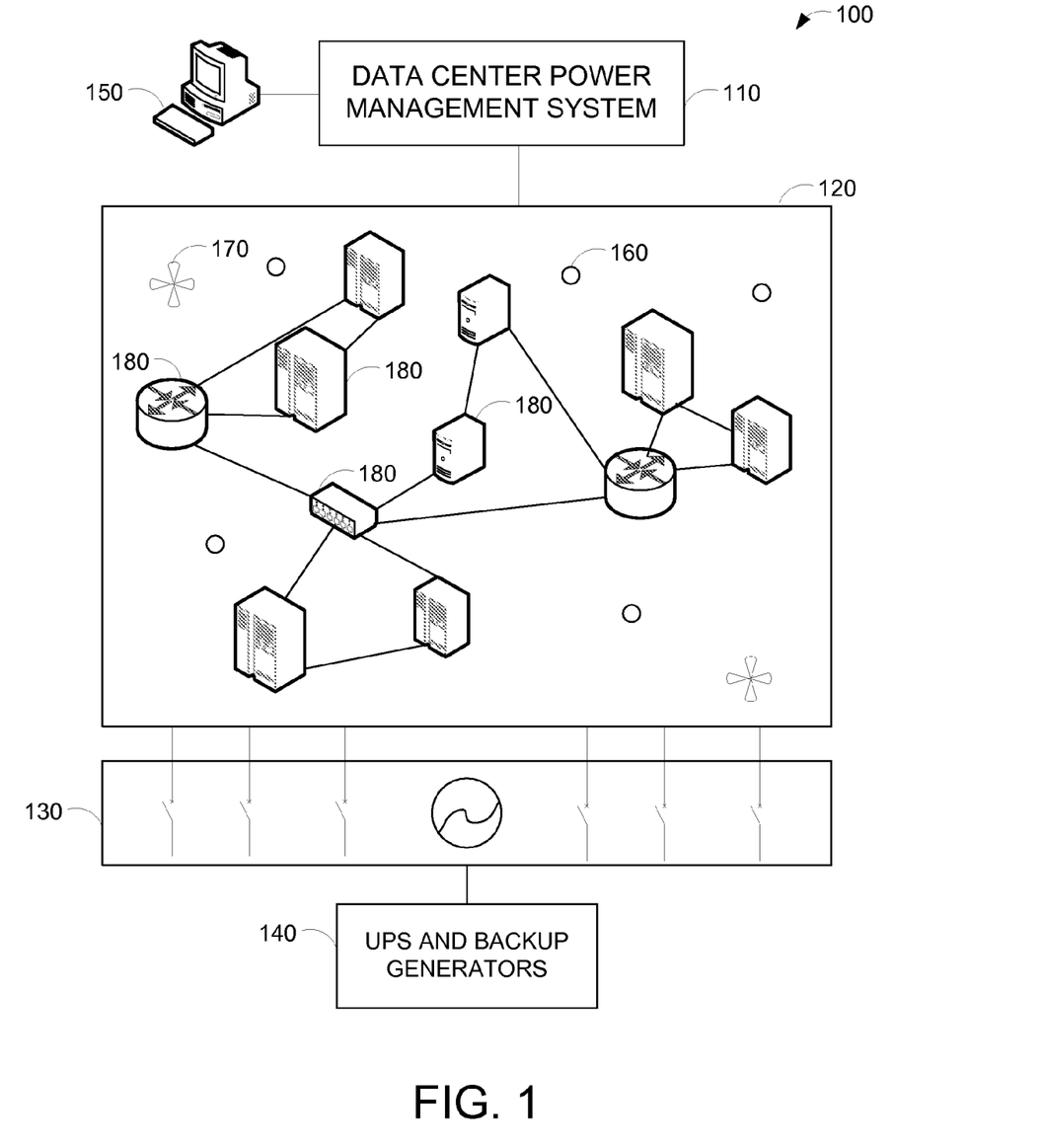
FIG. 1 is a network diagram that illustrates an exemplary operating environment, according to embodiments of the present invention.

FIG. 1 is a network diagram that illustrates an exemplary operating environment 100, according to embodiments of the present invention. The operating environment includes a data center power management system 110, a data center 120, a managed power distribution component 130, a uninterrupted power supplies (UPS) and backup generators 140, remote client devices 150, climate sensors 160, heating ventilation and air condition (HVAC) equipment 170, and network elements 180. In certain embodiments of the present invention, environmental devices include the UPS and backup generators 140, HVAC equipment 170, and environmental sensors 160.

The data center power management system 110 provides a system that manages power in a data center or any facility hosting multiple network elements. The data center power management system utilizes databases, environmental sensors 160, HVAC equipment 170, and a power management server to efficiently operate network elements in the data center 120 during a planned or unplanned power outage or HVAC failure. As further described below with reference to FIG. 2 the power management server utilizes information provided by the environmental sensors 160 to detect environmental conditions and in response the power management system, initiates power down actions based on the roles of the network elements. Also, the power management server provides the data center management system with an extendable open management solution that facilities power management during planned and unplanned system outages. The extendable open management solution provides granular control of network element in the datacenter that impacts overall power usage.

The data center 120 includes network elements 180 and environmental devices 140, 170, 160. The network elements 180 include routers, hubs, switches, mainframes, servers and other computing elements that provide one or more network services. The network elements 180 may include failover clusters, where one or more network elements 180 backup a primary network element 180. The environmental devices 140, 170, 160 monitor the network elements and climate conditions in the data center and provide the data center management system with environmental data. For instance, the climate sensors 160 may provide environmental data that includes airflow measurements, temperature and humidity measurements; the HVAC equipment 170—such as, ducts, fans, air blowers, heaters and coolers—may provide environmental data that includes an HVAC equipment status, which specifies that a HVAC equipment failure occurred; and the ups and backup generators 140 may provide environmental data that includes a UPS and backup generator supply capacity and an indication that network elements 180 in the data center 120 are operating on power supplied from the UPS and backup generators 140.

The managed power distribution component 130 manages the power supplied to each network element in the data center when the power is supplied from a primary source or the UPS and backup generators 140. The managed power distribution component 130 measures power usage associated with each network element 180 in the data center 120. The power usage data is environmental data that is sent to the data center management system 110 to determine which network elements 180 in the data center 120 are large power consumers. The data center power management system 110 may utilize the environmental data provided by the managed power distribution component 130 to select and power off noncritical network elements 180 that consume large quantities of power. In some embodiments, powering off the noncritical network elements 180 includes performing a logical shutdown and a physical shutdown.

After performing the logical shutdown on the noncritical network elements 180, the managed power distribution component 130 receives instructions to perform the physical shutdown by removing power to the physical interfaces of one or more noncritical network elements during a planned or unplanned power outages and HVAC equipment failures.

The remote client device 150 may trigger a planned power outage. The remote client device 150 may utilize the data center power management system 110 to granularly control each of the network elements in the data center 120. The remote client device 150 receives suggestions from the data center power management system 110 that indicated which network elements 180 are noncritical based on the roles assigned to network elements 180. In some embodiments, the noncritical network elements may be ranked based on the power consumption associated with each noncritical network element. For instance, the non-critical network element that is highest power consumer is assigned a high rank as compared to network elements that are not high power consumers. The higher ranked noncritical network element are suggested to be among the first network elements that should be powered off.

Accordingly, the data center power management system controls the power to each network element during planned and unplanned outages and HVAC equipment failure. One of ordinary skill in the art appreciates and realizes that other configurations are within the scope of the present invention.

The data center management system utilized a power management server that generates instructions to perform the logical and physical shutdown to non-critical network elements. The power management system includes database and a collection of interface components that enable communication with a remote client device, network elements, environmental devices, and a managed power distribution component. The power management server stores communicates with the network elements and environmental devices and to archive events and actions that occurred in the data center.

Figure 2:
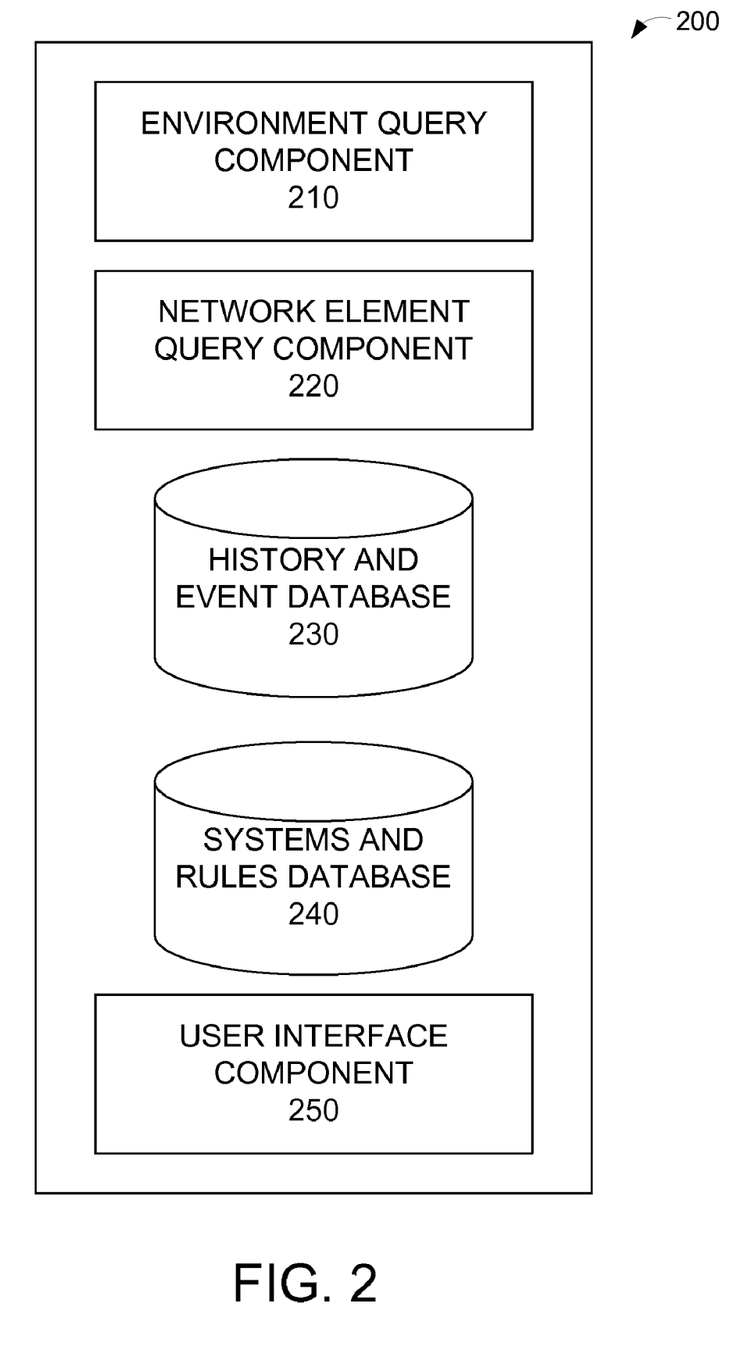
FIG. 2 is a network diagram that illustrates an exemplary power management server, according to embodiments of the present invention.

FIG. 2 is a network diagram that illustrates an exemplary power management server 200, according to embodiments of the present invention. The power management server 200 includes a environmental query component 210, network element query component 220, a history and event database 230, a system and rules database 240, and an user interface component 250.

The environmental query component 210 polls the environmental devices to retrieve environmental data. The environmental query component 210 provides interfaces for the environmental devices and the managed power distribution component. The environment query component 210 also triggers the managed power distribution component to perform a physical shutdown of one or more network elements based on a instructions received from the systems and rules database 240. The instructions may be generated in response to selections received from a remote client device during a planned power outage or in response to the network element query component 220 providing an indication that a logical shutdown occurred to one or more non-critical network element during an unplanned outage. The environmental data received from the environmental devices are stored in the history and event database 230. The environmental data includes, but is not limited to, HVAC data indicating cooling or heating device failure, UPS or backup generator data that indicates an on or off status of the UPS or back generator, and capacity information for the UPS and backup generator. Accordingly, during planned and unplanned outages or HVAC equipment failure, the environmental query component 210 may contact the managed power distribution component to power-on or power-off network elements in the data center based on the roles of the network elements and the environmental data provided by the environmental devices.

The network element query component 220 communicates with an interface connector shim associated with each network element to perform a logical shutdown on one or more network elements in the data center. The network element query component 220 generates instructions associated with logical shutdown. In a planned power outage, the remote client device communicates with the user interface component to select one or more network elements that should be shutdown or initiated based on suggestions received from the system and rules database 240. During an unplanned power outage, the system and rules database 240 communicates with the network element query component 220 to directly perform a logical shutdown or to initiate network applications on one or more network elements without user intervention. Based on the selections and instructions received from the remote client device or the system and rules database, the network element query component 220 generates instructions that perform failover operations when performing a logical shutdown of one or more clustered network elements that include backup network elements. The failover operations may include initiating one or more network element applications on backup network elements, and centralizing distributed network applications by perform logical shutdowns on noncritical network elements that execute different functions of the distributed network application. The interface connector shim associated with each network element provides the network element query component 220 feedback to that indicates that the instructions were successfully executed and provides a status of the network applications and network elements that were identified in the instructions. In some embodiments, the feedback is stored in the history and event database 230 for trend analysis. After the logical shutdown is complete, the network element query component 220 or the system and rules database 230 triggers the environmental query component 210 to perform a physical shutdown of the network element. In some embodiments of the present invention, the physical shutdown may be supplemented with instructions to power-on one or more network elements.

The history and event database 230 stores event information for trend analysis and to detect network element power usage during a planned or unplanned power outage or HVAC equipment failure. The history and event database records environment events such as HVAC device failure, backup generator status or UPS status, network element logical shutdown and initialization, and network element physical shutdown and power-on. The history and event database 230 stores event information during the unplanned and planned power outages. Thus, the history event database 230 includes, but is not limited to, events received from the remote client device, events provided by the environmental devices, and feedback received from the interface connector shim. For instance, the stored events include that indications that the remote user has selected a network element for logical shutdown or any other interaction with data center power management system. Additionally, the stored events may include indications provided by the climate sensors, HVAC, UPS, or backup generator and events related to realtime power consumption associated with each network element in the datacenter. Furthermore, the history and event database 230 stores events received from the remote client device when a user changes the data center layout, such as adding climate sensors or adding new network elements to the data center, or any other change that impact the overall power capacity or HVAC capacity in the data center.

The system and rules database 240 stores data that identifies the network elements that are large consumers of power provided to the data center. The systems and rules database 240 stores network element information and rules that provide thresholds associated with the existence of an environmental condition. The thresholds may be utilized to detect power outages or a HVAC failures that impact the performance of the data center. The system and rules database 240 may also store environmental device power, heating, and cooling capacity. The power capacity may include a number that indicates how much backup power the UPS and backup generator can provide. The heating and cooling capacity may provide heating cooling capacities associated with the HVAC equipment. The network element information stored in the system and rules database 240 provides a digital footprint of each network element in the data center. The digital footprint includes information on the network element's physical attributes, such as space occupied by the network element and power usage associated with the network element. The digital footprint may includes role data corresponding to each network element that indicates which network element are least and most important. The digital footprint may include real-time network element power usage data provided by the managed power distribution component. The system and rules database 240 also includes rules that are utilized to select network elements that should be powered-on or powered-off, and network element applications that should be shutdown or initiated. The rules provide thresholds that keep the data center operational based on the element roles and environmental data. The rules may be utilized by the data center power management system to determine how many network elements are eligible for logical shutdown and the rules may inform the data center power management system which network elements should be operational at all times during the outage. For instance, the rules may indicate that the least important elements that consume large amounts of power are targeted first for shutdown and power down. Further, the rules may require a subset of redundant critical network elements that consume large amounts of power to be shutdown if needed to keep system operating for a long period of time. The system and rules database 240 generates suggestions which indicate the network elements that should be powered-off and powered-on based on the current environmental data, role data and power usage information. In some embodiments, when a network element is associated with multiple roles, the systems and rules database 240 may specify a rule that requires the network element to be operational during a planned or unplanned outage. Alternatively, the system and rules database may indicate only shutting down certain network element applications associated with multiple role network elements and keeping the network element powered on during the planned and unplanned power outage. The system and rules database stores instructions associated with performing logical and physical shutdowns on the network elements in the data center. Accordingly, during the unplanned and planned power outage or HVAC failure, the system and rules database 240 may utilize the device power information to make a determination on the capacity of the data center and maximum and minimum uptimes times feasible for the data center. The uptimes are utilize to make appropriate suggestions that specify network elements that should be logically and physically shutdown.

The user interface component 250 provides an interface for the remote client device to trigger a planned power outage. In some embodiments, the user interface component 250 may utilize hypertext transport protocol (HTTP) and an ajax scripting language to generate a display for a client. The user interface component 250 provides the display that includes suggestions provided by the system and rules database 240. The client utilizing the remote client device may select on or more network elements include in the suggestions provided by the system and rules database 240 through the user interface component 250. The user interface component 250 sends the selection to the history and event database 230 for storage and informs the network element query component 220 of the user selection. In turn, the network element query component 220 performs a logical shutdown or any other appropriate action on one or more network elements included in the selection.

Accordingly, the power management server 200 may receives network element power usage data from the managed power distribution component and environmental data from the environmental devices, which are utilized to manage power allocation during power outages. The power management server 200 stores and reacts to environmental data and network element power usage data. The power management server 200 may trigger one or more stored rules that initiate changes in the network elements operating in the data center. The power management server 200 utilizes the rules to perform logical and physical shutdowns when reacting to environmental data such as, UPS load, running on backup generators, or HVAC failures.

The network elements in the data center include one or more applications that operate to provide services in the data center. The network elements may include an interface connector shim that enable communication with the power management system. Also, the network elements may include a power interface that enables the managed power distribution component to remove power from the network elements.

Figure 3:
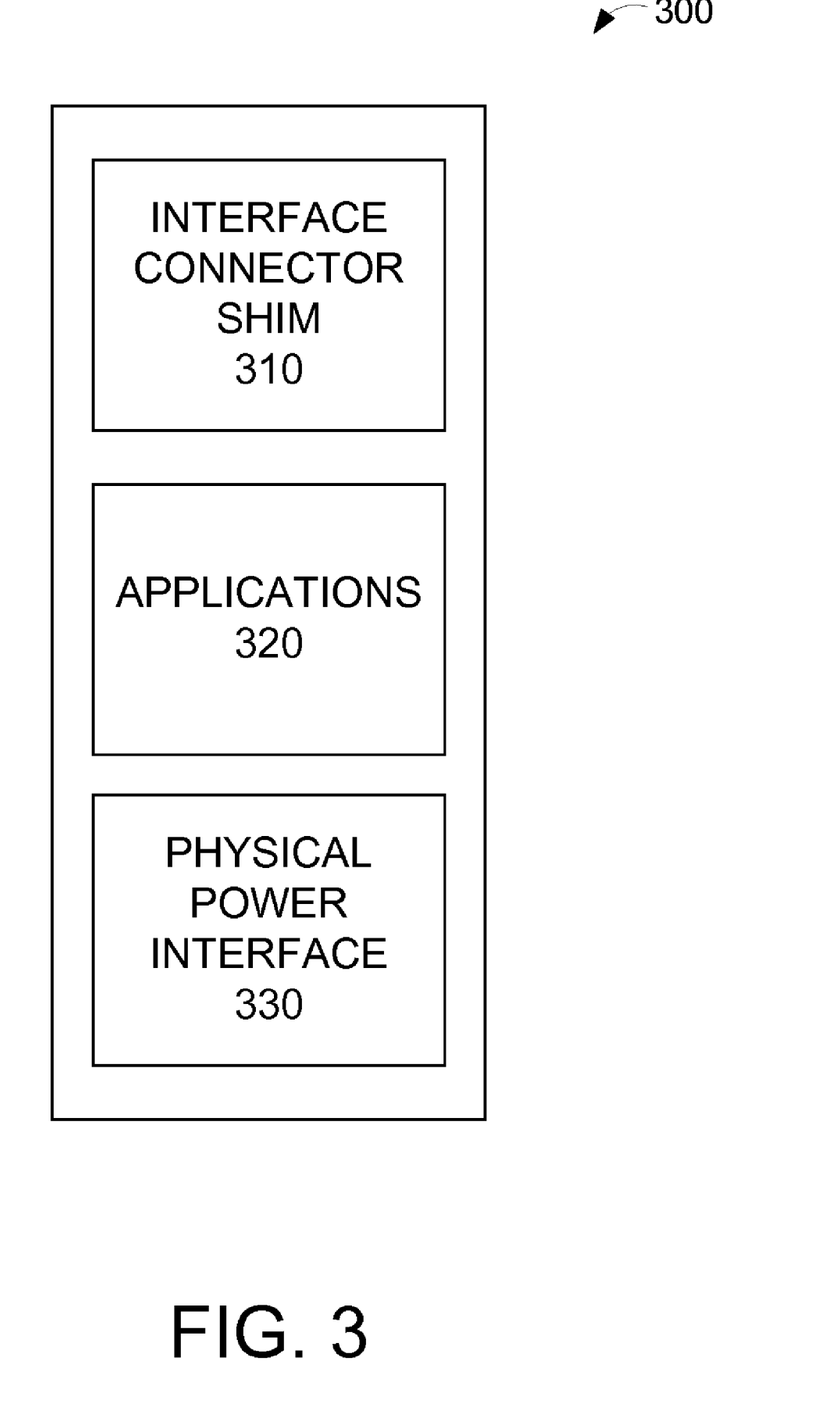
FIG. 3 is a network diagram that illustrates an exemplary network element, according to embodiments of the present invention.

FIG. 3 is a network diagram that illustrates an exemplary network element 300, according to embodiments of the present invention. The network element 300 includes a interface connector shim 310, application 320, and a physical power interface.

The interface connector shim 310 enables a logical shutdown of network element applications, such as database applications, messaging applications, file transfer application, operating system application, or any other suitable network element application. Additionally, when a network element 300 is part of a cluster having backup network elements 300, the interface connector shim 310 is utilized to startup a network element application on a backup network element 300. After the backup network element is powered-on and executing the network application, the interface connector shim 310 performs a logical shutdown on the network element 300 and communicates with power management server to trigger the managed power distribution component to perform a physical shutdown of the network element 300.

In some embodiments on the present invention, A network element application 320 may be configured to operate in a distributed mode where multiple network elements 300 provide processes providing different function corresponding to the network element application 300. When a power outage occurs and the data center relies on emergency power, the power management server may communicate with interface connector shim 320 to centralize all functions of the network application 300 to one or more network elements 300 having critical roles in the data center. In turn, the interface connector shim 310 logically shutdown the processes and the network applications 320 before the managed power distribution component is instructed to perform a physical shutdown on the network element 300. For example, a data center with or four network elements 300 running a network application 320 distributed among the four network element 300, but in an emergency one network element 300 could execute the network element application 320. When the data center operates on backup power, the power management server may utilize the interface connector shim 310 to centralize all processes associated with the network application 320 on one of the four network elements 300. In turn, the power management server managing the data center may perform logical and physical shutdowns on the other three network elements 300 to reduce load on the UPS or backup generator during a planned or unplanned power outage. Accordingly, the power management sever communicates with the interface connector shim 310 to keep network elements 300 that have critical roles online during the planned and unplanned power outages.

The applications 320 include operating system applications that are executed by the network element 300. The interface connector shim 310 may selectively select whether all application 320 or a subset of application are subject to instructions received by the interface connector shim 310. The logical shutdown of the application 320 prevents the network element from executing the application 320. The logical shutdown of the applications 320 does not remove power form the network element 300.

The physical power interface 330 of each network element 300 is connected to the managed power distribution component. In response to instructions received from the power management server, the managed power distribution component performs a physical shutdown of the network element 300. The physical shutdown removes the network element 300 from the power supplied by the primary power source, the backup generator, or UPS. Accordingly, in response to an HVAC failure or planned and unplanned power outages, the managed power distribution unit may perform physical shutdowns that completely remove the network element 300 from a power supply.

Figure 4:
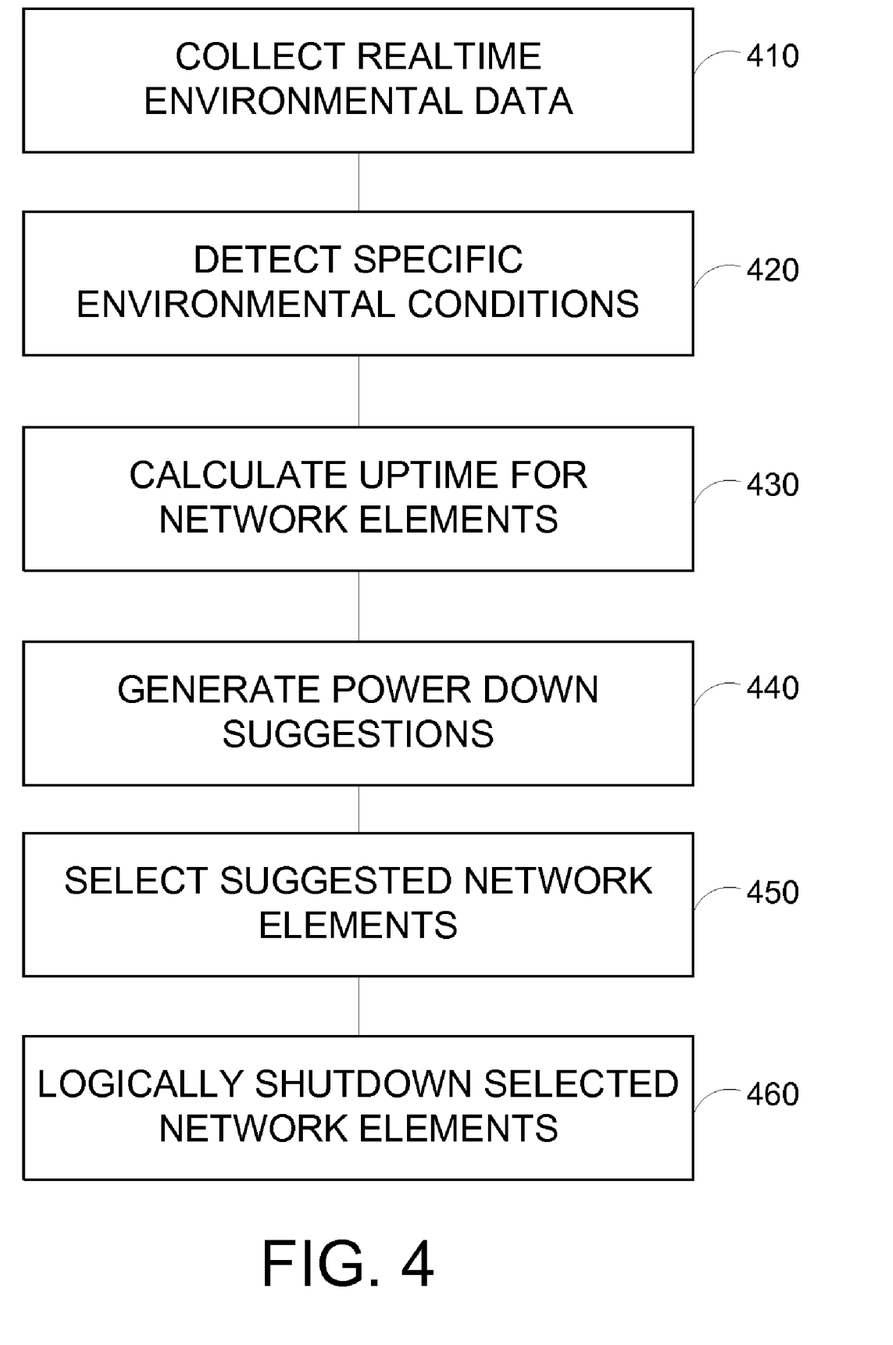
FIG. 4 is a flow diagram that illustrates an exemplary method to respond to unplanned power outages, according to embodiments of the present invention.
Figure 5:
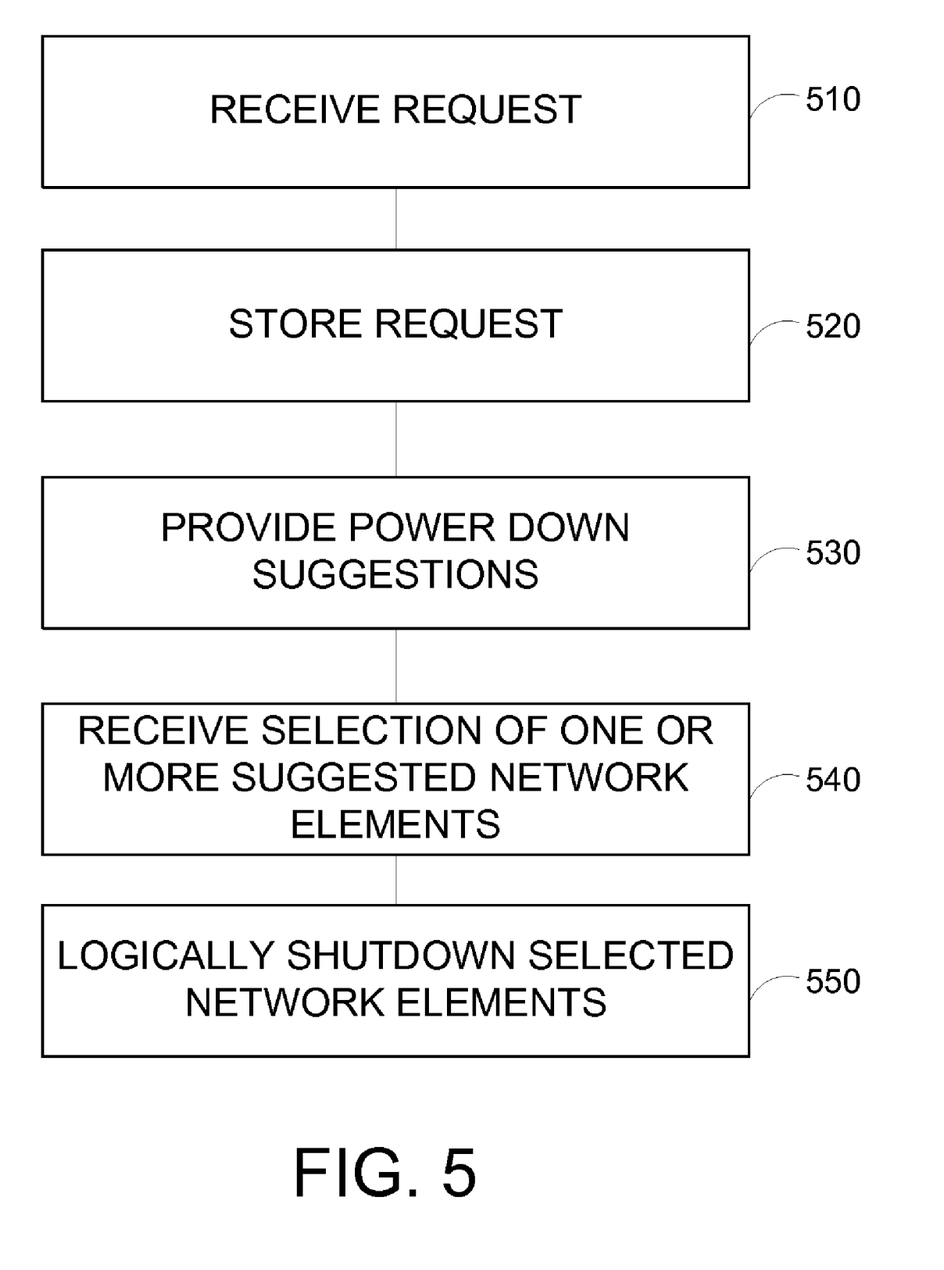
FIG. 5 is a flow diagram that illustrates an exemplary method to trigger a planned power outage in a data center, according to embodiments of the present invention.

The planned and unplanned power and HVAC device failure trigger the power management server to perform actions that attempts to increase uptime for critical network elements. Noncritical network elements are logically shutdown and physically shutdown to reduce the load in the data center. FIGS. 4 and 5 provide exemplary methods for responding to a unplanned and planned power outage, respectively.

FIG. 4 is a flow diagram that illustrates an exemplary method to respond to unplanned power outages, according to embodiments of the present invention. In step 410, the environmental devices collection realtime environmental data. In step 420, the data center power management system detects one or more specific environmental conditions. In turn, the data center power management system calculates an uptime for the network elements included in the data center in step 430. In step 440, the data center power management system generates suggestions that specify one or more network elements that should be shutdown bases on the roles associated with network elements. In step 450, the data center management system automatically selects one or more suggested network elements. In step 660, a logically shutdown of the selected performed based on the instruction generated by the data center power management system.

FIG. 5 is a flow diagram that illustrates an exemplary method to trigger a planned power outage in a data center, according to embodiments of the present invention. In step 510, a request for a planned power outage in received by the data center power management system from a remote client device. In step 520, the data center power management system stores the request in a history and event database. In step 530, the data center power management system provides one or more suggestions that specify network elements that are eligible for shutdown based on the roles of the network elements to the remote client device. In step 540, the remote client device provides a selection of one or more of the network elements. In turn, the selected network elements are logically shutdown by the data center power managements system in step 550.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more tangible computer-readable storage media having computer-useable instructions embodied thereon for performing a method to respond to unplanned power outages in a data center, the method comprising:
    collecting realtime environmental data for the data center and each network element in the data center;
    detecting a specific environmental condition based on the realtime environmental data;
    calculating uptime remaining for network elements currently operating in the data center, wherein the uptime is a function of the power capacity for the data center and the digital footprints of the network elements;
    generating power down suggestions specifying one or more network elements based on the role of the network elements;
    selecting suggested network elements that consume large quantities of power; and
    generating instructions that perform a logical shutdown of the selected network elements, wherein the logical shutdown closes a subset of applications executing on the selected network element.

2. The storage media of claim 1, wherein the realtime environmental data includes at least one of power capacity data, climate condition data, and HVAC failure data, and backup generator status data.

3. The storage media of claim 1, wherein the specific environmental condition includes receiving environmental data that provides an indication that power is supplied by one or more backup generators.

4. The storage media of claim 1, further comprising generating a notification that memorializes an occurrence of the specific environmental condition to a remote device.

5. The storage media of claim 1, further comprising storing a flag, which indicates the selected network elements are offline, in an event database.

6. The storage media of claim 1, further comprising generating instructions that perform a physical shutdown of the selected redundant network elements.

7. One or more tangible computer-readable storage media having computer-useable instructions embodied thereon for performing a method to trigger a planned power outage in a data center, the method comprising:
    receiving a request to initiate a planned power outage from a remote client device;
    storing the request in an event database;
    providing power down suggestions specifying one or more network element in response to the request t;
    selecting one or more of the suggested network elements, wherein the suggested network elements are selected based on a role assigned to each network element;

and
generating instructions that perform a logical shutdown of the selected network elements, wherein the logical shutdown closes a subset of applications executing on the selected network element.

8. The storage media of claim 7, wherein the suggested network elements are selected based on a power consumption associated with each network element.

9. The storage media of claim 7, further comprising updating the event database to store a flag that indicates the selected network elements are offline.

10. The storage media of claim 7, wherein the instructions that perform a logical shutdown of the selected network elements, logically shutdowns less than all network elements in the data center.

11. The storage media of claim 7, further comprising generating instructions that remove physical power to the selected network elements.

12. The storage media of claim 11, wherein the instructions remove physical power to less than all of the network elements.

13. A data center power management system, the data center power management system comprising:
one or more environmental devices that provide realtime environmental data for a data center having network elements;
a managed power distribution component that manages power supplied to each network element in the data center by performing a logical shutdown of the network elements, wherein the logical shutdown closes a subset of applications executing on the selected network element; and
a power management server that controls the power provided to the network elements based on a role associated with the network elements, the power management server comprises a client interface that connects a remote device, a network element interface that connects to the network elements in the data center, a power management interface that connects to the managed power distribution component, and an environmental device interface that connects to the environmental devices.

14. The data center power management system of claim 13, wherein the realtime environmental data includes at least one of power capacity data, climate condition data, and HVAC failure data, and backup status data.

15. The data center power management system of claim 13, wherein the power management server utilizes the realtime environmental data to remove power from one or more network elements.

16. The data center power management system of claim 13, wherein the managed power distribution component removes physical power from one or more network elements that the power management server selects based on the role of the one or more network elements.

17. The data center power management system of claim 13, wherein the managed power distribution unit measure power consumed by each network element.

18. The data center power management system of claim 13, wherein the power management server includes a database that stores and tracks the realtime environmental data.

19. The data center power management system of claim 13, wherein the remote device is utilized during a planned power outage to receive user selections of network elements suggested for power down by the power management server.

20. The storage media of claim 7, wherein the logical shutdown further comprises centralizing distributed network applications or starting up one or more failover applications on a failover network element, the failover applications replace the subset of applications on the selected network element.

* * * * *